US012580215B2

(12) United States Patent
Li et al.

(10) Patent No.: US 12,580,215 B2
(45) Date of Patent: Mar. 17, 2026

(54) SYSTEM AND METHOD FOR CONTINUOUS FABRICATION OF GRADED STRUCTURED UNITS USING ADDITIVE MANUFACTURING

(71) Applicant: Advanced Manufacturing LLC, Windsor, CT (US)

(72) Inventors: Dongsheng Li, Farmington, CT (US); Thomas Maloney, Hebron, CT (US)

(73) Assignee: Advanced Manufacturing LLC, East Hartford, CT (US)

( * ) Notice: Subject to any disclaimer, the term of this patent is extended or adjusted under 35 U.S.C. 154(b) by 262 days.

(21) Appl. No.: 18/526,891

(22) Filed: Dec. 1, 2023

(65) Prior Publication Data

US 2024/0178428 A1 May 30, 2024

Related U.S. Application Data

(63) Continuation of application No. 17/092,503, filed on Nov. 9, 2020, now Pat. No. 11,837,766.

(51) Int. Cl.
*H01M 8/1253* (2016.01)
*B29C 64/118* (2017.01)
(Continued)

(52) U.S. Cl.
CPC ......... *H01M 8/1253* (2013.01); *B29C 64/118* (2017.08); *B29C 64/268* (2017.08);
(Continued)

(58) Field of Classification Search
None
See application file for complete search history.

(56) References Cited

U.S. PATENT DOCUMENTS 7,527,761 B2    5/2009   Swartzlander et al.
8,304,128 B2    11/2012  Hendriksen et al.
                (Continued)

FOREIGN PATENT DOCUMENTS

EP          2839905 A1 *   2/2015   ............... F02K 9/97
WO       WO-0242521 A1 *   5/2002   ............. B29C 41/36

OTHER PUBLICATIONS

Yun-Tak Lim, Micro-solid Oxide Fuel Cells with Yttria-stabilized Zirconia and Nanoporous Pt Electrodes, Bulletin-Korean Chemical Society, Sep. 2013, 4 pages.
(Continued)

*Primary Examiner* — Colin W. Slifka
(74) *Attorney, Agent, or Firm* — UConn IP Law Clinic; Jacob Gardner; William Roberts

(57) ABSTRACT

A system and method of continuous fabrication of multi-material graded structures using additive manufacturing is disclosed. Using multi-material feedstocks and optimized processing parameters, the gradient on composition and structure are controlled to achieve smooth transition from one functional component to another functional component. A multi-material graded structure is produced as the feed-stocks are transported from the feedstock reservoir system comprised of many different materials. Interface transition from one functional layer to the next is gradient, controlled by feedstock mixture ratios based on the flow rate control for the feedstock system. Composition includes chemical com-position, physical composition, and porosity. Continuous automatic additive manufacturing method makes the fabri-cation more efficient and avoids joining problems. This method finds application in fabrication of a fuel cell, battery, reformer and other chemical reaction and process units, including structures made of multiple units, such as stacks, that incorporate multiple functional components.

16 Claims, 15 Drawing Sheets

(51) Int. Cl.

| | |
|---|---|
| *B29C 64/268* | (2017.01) |
| *B29C 64/393* | (2017.01) |
| *B29L 31/34* | (2006.01) |
| *B33Y 10/00* | (2015.01) |
| *B33Y 50/02* | (2015.01) |
| *B33Y 70/00* | (2020.01) |
| *B33Y 80/00* | (2015.01) |
| *H01M 8/12* | (2016.01) |

(52) U.S. Cl.
     CPC ............ *B29C 64/393* (2017.08); *B33Y 80/00* (2014.12); *B29L 2031/3468* (2013.01); *B33Y 10/00* (2014.12); *B33Y 50/02* (2014.12); *B33Y 70/00* (2014.12); *H01M 2008/1293* (2013.01)

(56) References Cited

U.S. PATENT DOCUMENTS

| | | |
|---|---|---|
| 8,455,154 B2 | 6/2013 | Kwon et al. |
| 8,802,316 B1 | 8/2014 | Liu et al. |
| 9,252,447 B2 | 2/2016 | Yoon |
| 9,350,037 B2 | 5/2016 | Steinwandel et al. |
| 2015/0255820 A1 | 9/2015 | Shimomura et al. |

OTHER PUBLICATIONS

Siti Munira Jamil, et al, Recent fabrication techniques for micro-tubular solid oxide fuel cell support: A review, Journal of the European Ceramic Society, Sep. 12, 2014, 22 pages.

Soonwook Hong, et al, Single-chamber fabrication of high-performance low-temperature solid oxide fuel cells with grain-controlled functional layers, Journal of Materials Chemistry A, Dec. 8, 2016, 8 pages.

Amir Ghazanfari, et al, Additive manufacturing and mechanical characterization of high density fully stabilized zirconia, Ceramics International, Feb. 1, 2017, 7 pages.

Si-Jia Hao, et al, Fabrication of nanoscale yttria stabilized zirconia for solid oxide fuel cell, International Journal of Hydrogen Energy, Oct. 3, 2017, 11 pages.

Luyang Wei, et al, A novel fabrication of yttria-stabilized-zirconia dense electrolyte for solid oxide fuel cells by 3D printing technique, International Journal of Hydrogen Energy, Feb. 6, 2019, 10 pages.

S. Masciandaro, et al, Three-dimensional printed yttria-stabilized zirconia self-supported T electrolytes for solid oxide fuel cell applications, Journal of the European Ceramic Society, Nov. 15, 2017, 8 pages.

Bohang Xing, et al, Self-supported yttria-stabilized zirconia ripple-shaped electrolyte for solid oxide fuel cells application by digital light processing three-dimension printing, Scripta Materialia, Feb. 18, 2020, 4 pages.

Xiuping Zhang, et al, Additive manufacturing of zirconia ceramics: a state-of-the-art review, Journal of Materials Research and Technology, Jun. 23, 2020, 20 pages.

Wenhua Huang, et al, High-Performance 3D Printed Microtubular Solid Oxide Fuel Cells, Advanced Materials Technologies, Apr. 1, 2017, 5 pages.

M. Brown, et al, Structure/Performance Relations for Ni/Yttria-Stabilized Zirconia Anodes for Solid Oxide Fuel Cells, Journal of the Electrochemical Society, Sep. 22, 1999, 12 pages.

Yanhai Du and Olawale Samuel Fatoba, Additive Manufacturing of Advanced Solid Oxide Fuel Cells—A Review, ECS Transactions, 2019, 8 pages.

Haniyeh Fayazfar, et al, Additive manufacturing of high loading concentration zirconia using high-speed drop-on-demand material jetting, International Journal of Advanced Manufacturing, Aug. 6, 2020, 14 pages.

X. Y. Tai, et al, Accelerating Fuel Cell Development with Additive Manufacturing Technologies: State of the Art, Opportunities and Challenges, article, Dec. 2, 2019, 15 pages.

Farid Salari, et al, Hybrid additive manufacturing of the modified electrolyte-electrode surface of planar solid oxide fuel cells, International Journal of Applied Ceramic Technology, Mar. 31, 2020, 8 pages.

Tatsuya Kawada, et al, Characteristics of Slurry-Coated Nickel Zirconia Cermet Anodes for Solid Oxide Fuel Cells, Journal of the Electrochemical Society, 1990, 7 pages.

M. Lomberg, et al, Additive Manufacturing for Solid Oxide Cell Electrode Fabrication, ECS Transactions, 2015, 10 pages.

Laura Cabezas Peñalva, Optimal Feedstock Composition to Control the Porosity in Solid Oxide Fuel Cell Produced by Additive Manufacturing, report, Jun. 2020, 121 pages.

\* cited by examiner

Fig. 3 cathode electrolyte anode

SYSTEM AND METHOD FOR CONTINUOUS FABRICATION OF GRADED STRUCTURED UNITS USING ADDITIVE MANUFACTURING

RELATED APPLICATIONS

This application is a continuation application of U.S. application Ser. No. 17/092,503 filed on Nov. 9, 2020 of identical title, now U.S. Pat. No. 11,837,766.

BACKGROUND

There are many different methods to fabricate graded components that have been proposed and developed. Chemical vapor deposition, tape casting, screen printing, slurry-spraying, spray-painting, and slurry coating all have been reported in the literature. Due to the limitations of processing methods, most of these methods are not continuous. Production disruption that occurs when changing the raw material decreases the efficiency of the process, making large production infeasible. Furthermore, most of the composition gradients are reached by two or three layers with different compositions, which makes the gradient still large and discontinuous. There is a lack of a continuous processing method to reach smooth composition graded structure with high production efficiency. It would be useful to overcome these limitations.

SUMMARY

One embodiment disclosed herein is apparatus comprising a multi-material graded structure formed from materials that are mixed and melted into a melt pool utilizing a high energy source.

Another embodiment disclosed herein is method for producing a multi-material graded structure where an additive manufacturing process utilizing a high energy source and multiple material storage is used to produce a melt pool of multi-materials that is formed from materials fed into the melt pool at a precise and predetermined rate and mixture and where the multi-material from the melt pool is deposited upon a substrate to form a solid graded multi-material.

A further embodiment described herein is a method of utilizing a modified job code computer file for Computational Aided Machining in additive manufacturing machines with materials mix ratio description and implementation.

Other embodiments described herein include a system and method for continuous fabrication of graded structured units using additive manufacturing. Multi-material graded structure includes composition gradient, porosity gradient, morphology gradient, grain size gradient, and structural gradient.

According to yet another embodiment, a method is provided for fabrication of a composition gradient fuel cell unit with three components: anode, electrolyte and cathode. Gradient structure is applied at the interface of components. The unit can be fabricated with a laser beam powder feed additive manufacturing machine.

BRIEF DESCRIPTION OF THE DRAWINGS

FIG. 3 illustrates graded structure of battery composed by functional components with graded interface.

DETAILED DESCRIPTION

Figure 1:
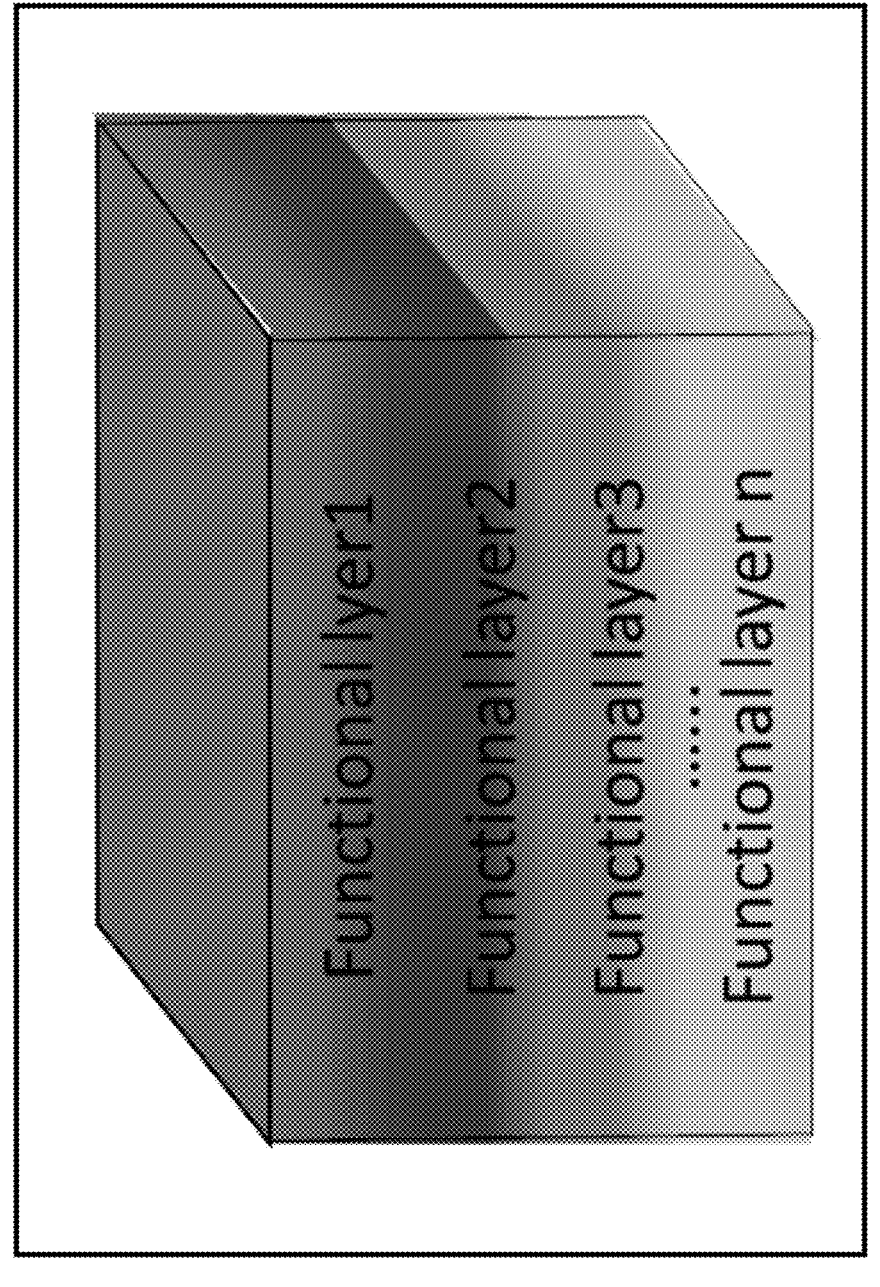
FIG. 1 illustrates graded structure of units in general composed by functional components with graded interface.

This disclosure relates to continuous fabrication of graded structure units using additive manufacturing. Using multi-material feeds and optimizing the fabrication processing parameters, the gradient material composition is controlled precisely to produce a smooth transition from one functional material component to another functional material component.

Continuous fabrication of graded structure units using additive manufacturing can be utilized to produce systems and components having tailored properties and structural designs that deliver low cost, high performing products. Energy conversion devices, such as fuel cells and batteries, can be fabricated with graded interfacial structures and in any geometry. This obviates the performance penalties and traditional design constraints that currently exist for electrochemical systems that are fabricated with stacks of flat plates of different materials stacked upon one another with non-graded interfaces. Furthermore, the methods proposed before could not produce free form structure A compositional and/or morphological and/or structural gradient in component material is preferred in many engineering applications. For example, components with gradient porosity have been applied in medical implants, heat insulation, and thermal shock resistant structures. To join dissimilar materials and decrease the mismatch in properties at interface, functionally graded materials have been developed to achieve unique properties and reach high performance. In fuel cell components, graded materials with porous gradient or chemical composition gradient have been developed and utilized. It was reported that graded structure components in fuel cells reduced interfacial polarization resistances and improved electrochemical performances. Graded structure in anodes, electrolytes and cathodes have all been reported. Another importance of graded structure in fuel cell lies on the requirement of oxygen reduction reaction, which happens at the triple phase boundary, co-incidence of oxygen gas, electronic conductor electrode and ionic conductor electrolyte. Graded structure increases the effective length of the triple phase boundary, improving the overall electrochemical performance.

This described embodiments can replace the conventional methods for fabricating components and systems, such as solid oxide fuel cells (SOFC) and other chemical reactor systems. For more than four decades, SOFCs have been made using conventional methods such as tape casting, calendar rolling, chemical/electrochemical vapor deposition, among others. These methods are costly, time-consuming, require processing in high temperature furnaces, and are constrained to planar or tubular design configurations. And significantly, these conventional methods are not continuous and they do not allow for materially-graded structures. Hence, the interfaces where differing materials meet are the source of performance degradation and subsequent failure. Attempts to overcome these deficiencies have led to lower temperature tolerant materials (600° C.-800° C.) which result in lower overall efficiency. This described embodiments enable fabrication of systems such as SOFCs such that the interfacial properties are satisfactory and sustained high temperature (1,000° C.), high efficiency operation is enabled. The components and parts can be made via a continuous manufacturing process, and geometries for builds are not limited to planes and tubes. The disclosed embodiment find application in, but not limited to, fuel cells, energy storage units, energy conversion units, chemical reformers, and so on.

The embodiments described herein utilize additive manufacturing methods in fabrication. The manufacturing methods include but are not limited to powder additive manufacturing and wire feed additive manufacturing. The methods include but are not limited to powder feed additive manufacturing and powder bed additive manufacturing. The methods include but are not limited to those that employ laser source, electron beam source, and/or kinetic energy source additive manufacturing methods.

One embodiment focuses on fabrication of graded structure. Graded structure includes but not limited to gradients in porosity, chemical composition, architecture, and/or morphology. The general purpose of graded structure is to reach the gradient of properties, including but limited to mechanical, electrical, chemical and magnetic properties.

A graded structure with multiple function layers is illustrated in FIG. 1. Most units are composed by multiple layers or components. Each layer or component comprises different materials. The interface of layers usually has sharp contrast of property. For example, thermal shock may be introduced due to difference in thermal expansion coefficients. A graded structure is introduced at the interface to reduce the sharp contrast. As shown in FIG. 1, the interfaces or boundaries are blurry. By introducing the gradient structure at the interface transition in fuel cells, the change in thermal expansion coefficient and mechanical properties are gradient. The life of the SOFC will be extended due to the reduced thermal induced stress during operation cycles. Furthermore, the efficiency of the fuel cell unit will be increased by increasing the interface area between the electrode and electrolyte. The interfaces of layers in FIG. 1 is linear or planar. The present embodiments are not limited to planar or tube shaped interface. Due to the flexibility of additive manufacturing method, there is no limitation to the shape of interface.

The capability to customize electrode, electrolyte, and interconnecting functional elements can lead to increased operating efficiency, decreased performance degradation rates, and increased number of on/off cycles. Overall system efficiency can be defined as the electrical power delivered divided by the lower heating value of fuel consumed. Additional efficiency gains can be accrued if waste heat is productively utilized. On/off cycles induce thermal stresses due to thermal expansion rate differences between the electrodes, electrolytes, and interconnect. Graded interfaces are expected to lessen the thermal stresses during on/off cycles.

Figure 2A:
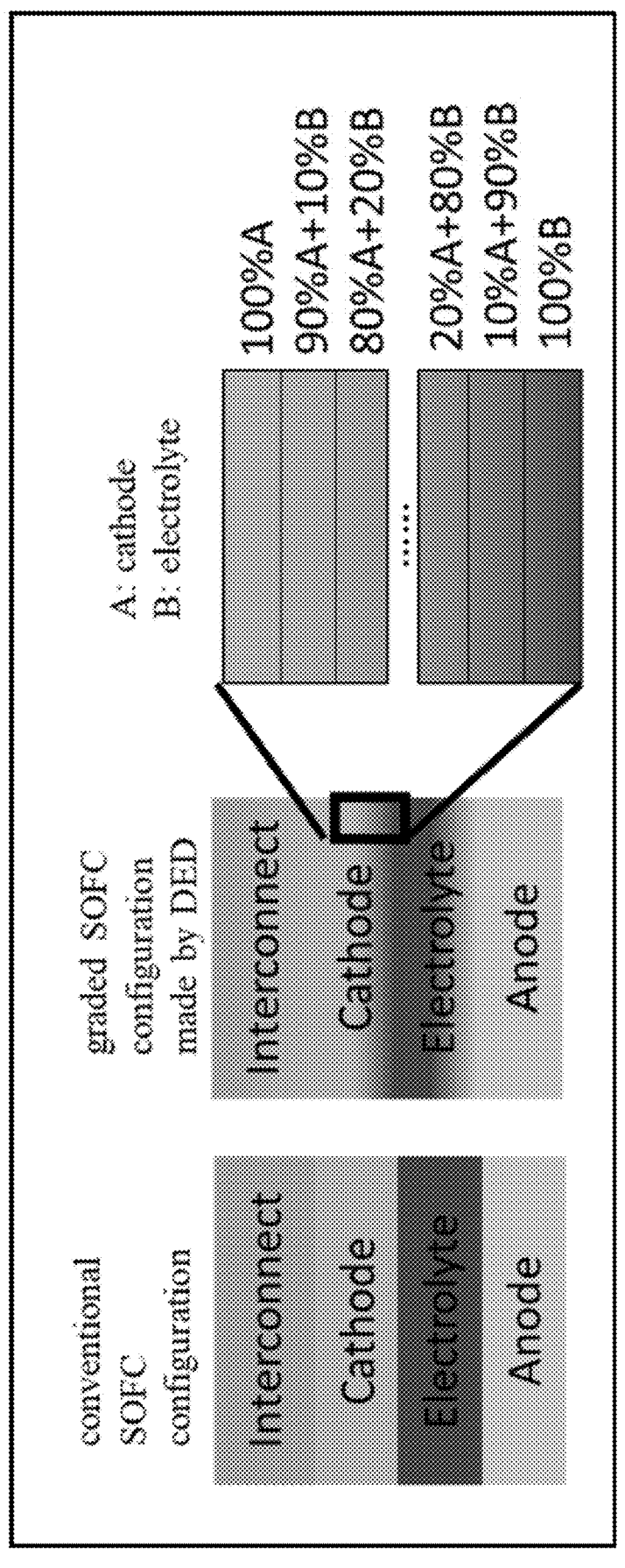
FIG. 2A compares conventional and graded solid oxide fuel cell configuration.

One example of the graded structure is applied in a solid oxide fuel cell, as illustrated in FIG. 2A. The left figure shows a conventional configuration of a solid oxide fuel cell. Components of different functional layers are stacked together. The layers include but not limited to interconnect, cathode, electrolyte, and anode. The layers are not limited to planar or tube configuration. The stacks are connected by, but not limited, physical contact, deposition, diffusion, joining, etc. In a conventional configuration, the boundaries between the functional layers are clear. The right figure shows a graded configuration of solid oxide fuel cell in accordance with embodiments described herein. Interfaces of the functional layers are blurry. One non-limiting example is a structure in which the electrolyte comprises yttria stabilized zirconia (YSZ), and the anode comprises nickel reduced from nickel oxide. The interface between the YSZ and nickel oxide comprises multiple very thin layers smoothly changing the chemical composition with a small gradient.

Figure 2B:
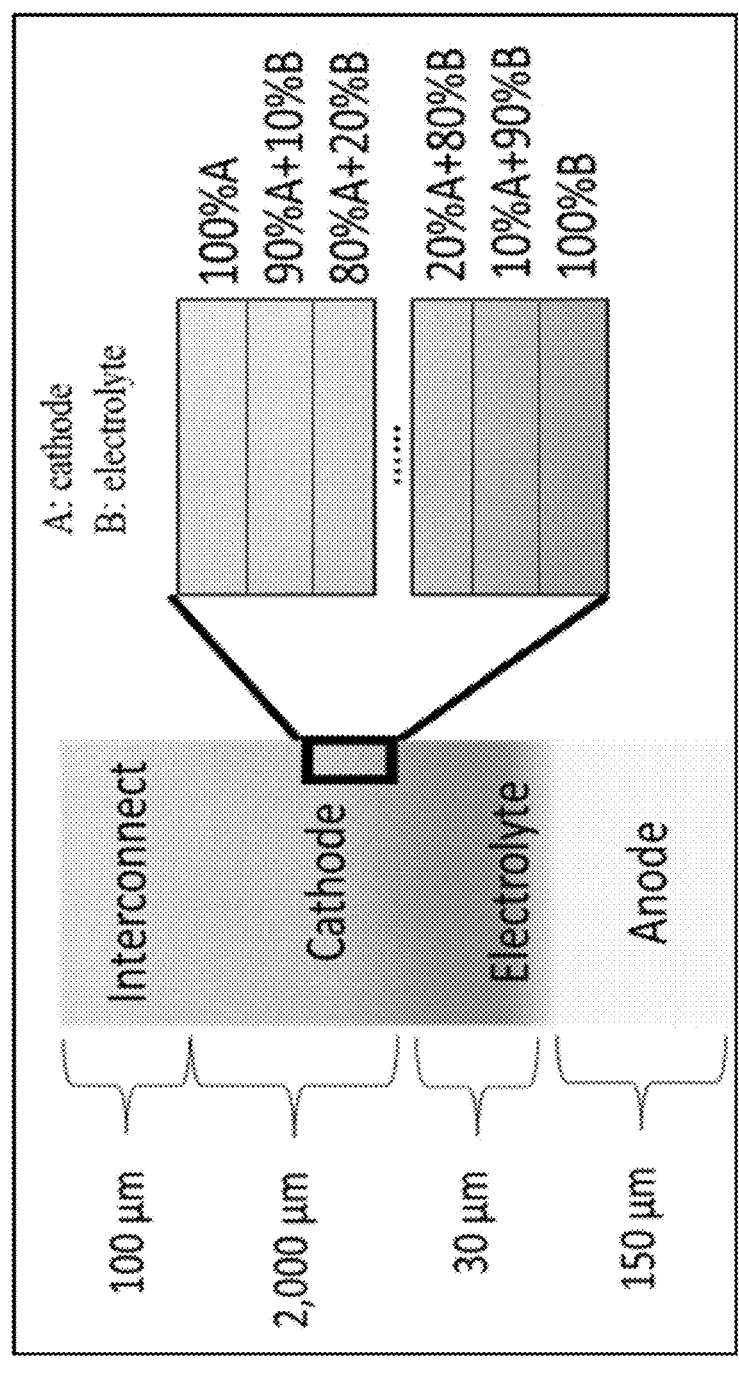
FIG. 2B shows the size of the various graded components for one embodiment of the solid oxide fuel cell configuration.

A solid oxide fuel cell has two categories: anode support or cathode support. The size of the unit cell is in the range of 4-2500 cm² with side 5-50 cm. The thickness of the electrolyte is between 3-300 μm. The gradient change from electrode to electrolyte is between 10 μm⁻¹-10 mm⁻¹. In other words, 20% composition change within 4-80 μm. Several different embodiments for SOFC structures can be considered, depending upon desired geometry (planar, tubular, monolithic, unique geometry) of final product. In one tubular embodiment, the cathode is relatively thick compared to the electrolyte, anode, and interconnect. For this case, a graded structure may be envisioned as shown in FIG. 2B. The grading between cathode and electrolyte may be uniform at 10% grading per 200 μm thickness. Similarly, the anode in such embodiment may be graded at a higher level, at 10% grading per 15 μm thickness. This is shown in FIG. 2B where a graded SOFC configuration made by directed energy deposition (DED) (10% grading per 200 μm) is shown.

Alternative grading scales may also be implemented. For example, the cathode in FIG. 2B may be comprised of pure, bulk cathode material at its interior, and the grading may occur only near the interfaces. In this case, the cathode-electrolyte structure may be graded at 10% per 10 μm thickness, assuming only the 100 μm portion of the cathode, closest to the electrolyte, is graded. Other embodiments may be fabricated with electrolyte, anode, or interconnect comprising the thickest component.

Figure 3:
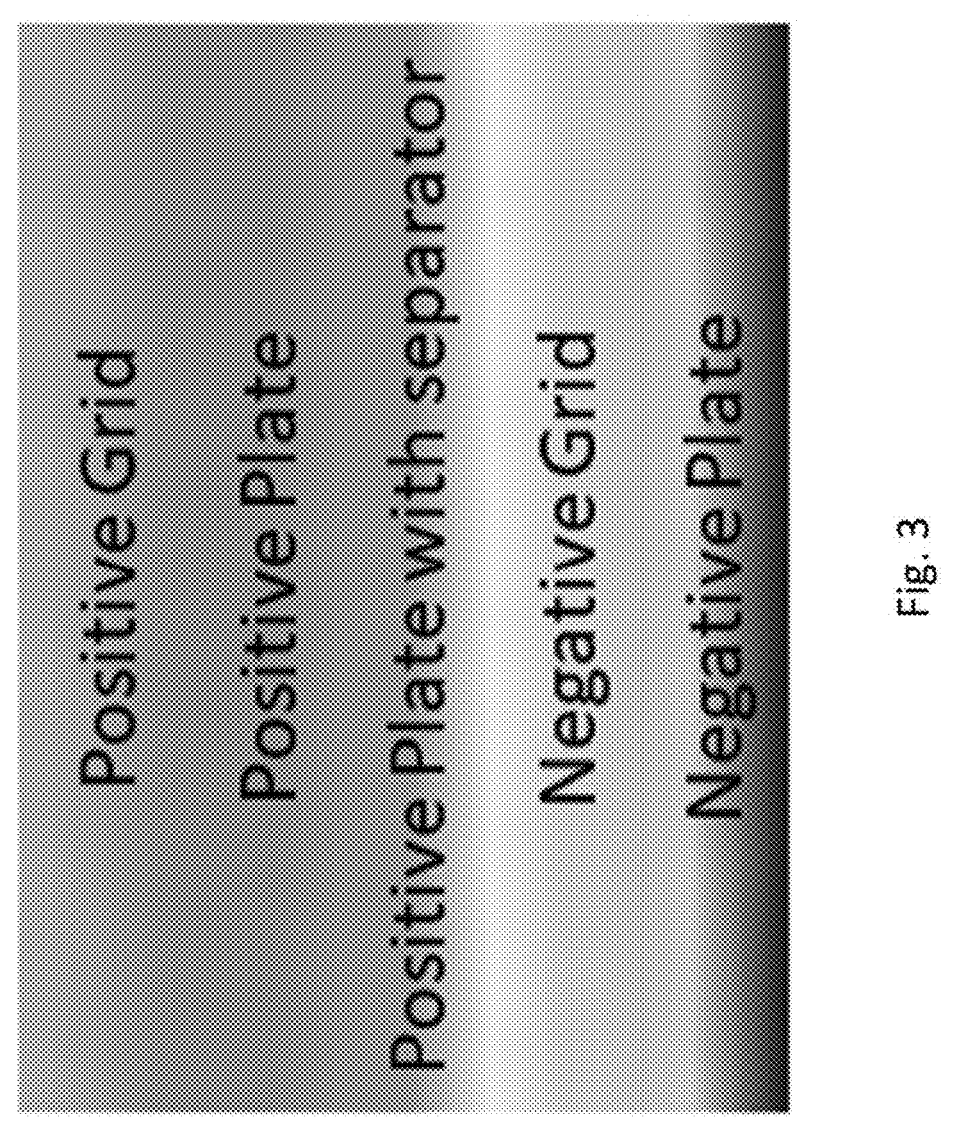

A similar approach is applied to other devices, such as battery, as illustrated in FIG. 3. Functional layers in a battery include, but are not limited to, positive grid, positive plate, separator, negative grid and plate. The interfaces between the functional layers are designed to be transient with graded structure. The present embodiment is not limited to fuel cells, battery, chemical transformer.

Figure 4:
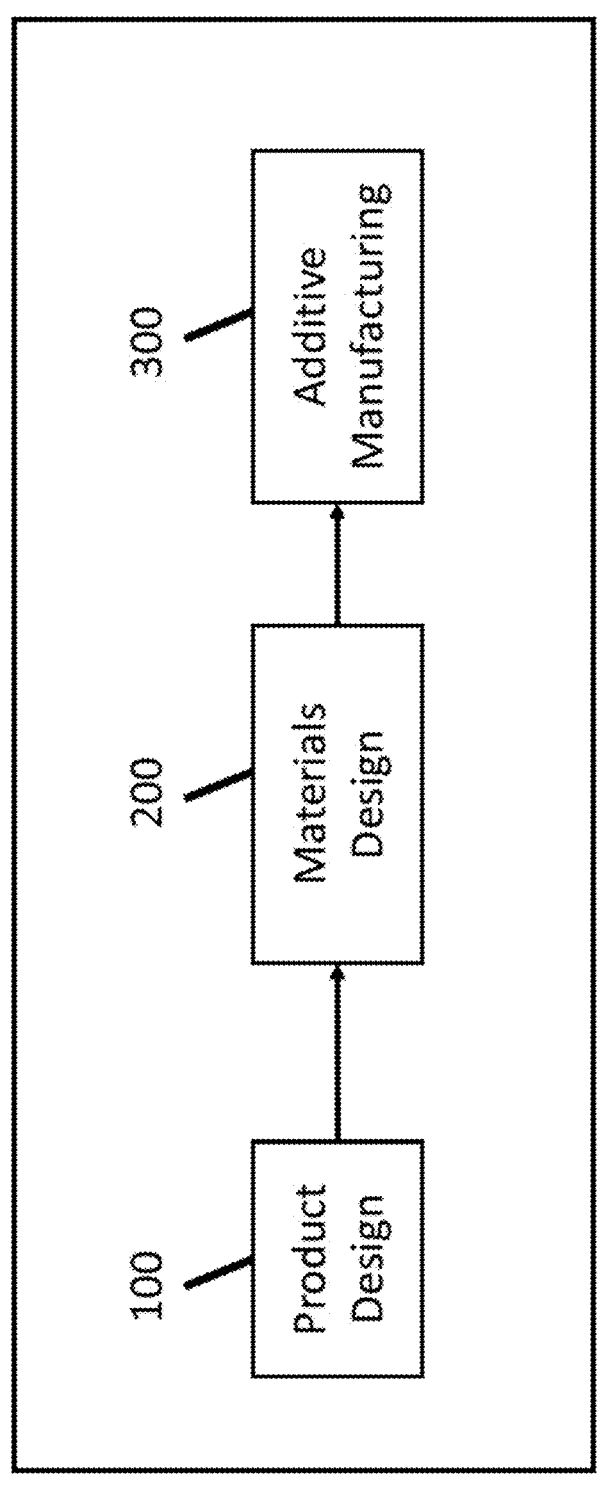
FIG. 4 shows a process flow of manufacturing of graded structured unit and components using additive manufacturing.

FIG. 4 shows the process flow of system in present embodiment. It includes but not limited to three steps: product design, materials design and process optimization. The overall process is designated as 96. In stage 100, product design, the CAD file with geometry information will be created to satisfy the function of parts. In stage 200, materials design, the material composition will be decided to reach the mechanical, electrical, and chemical requirement for parts. Gradient of chemical composition is also decided in this stage. In stage 300, additive manufacturing, the processing parameters and procedures will be optimized to achieve desired microstructure and superior properties.

Figure 5:
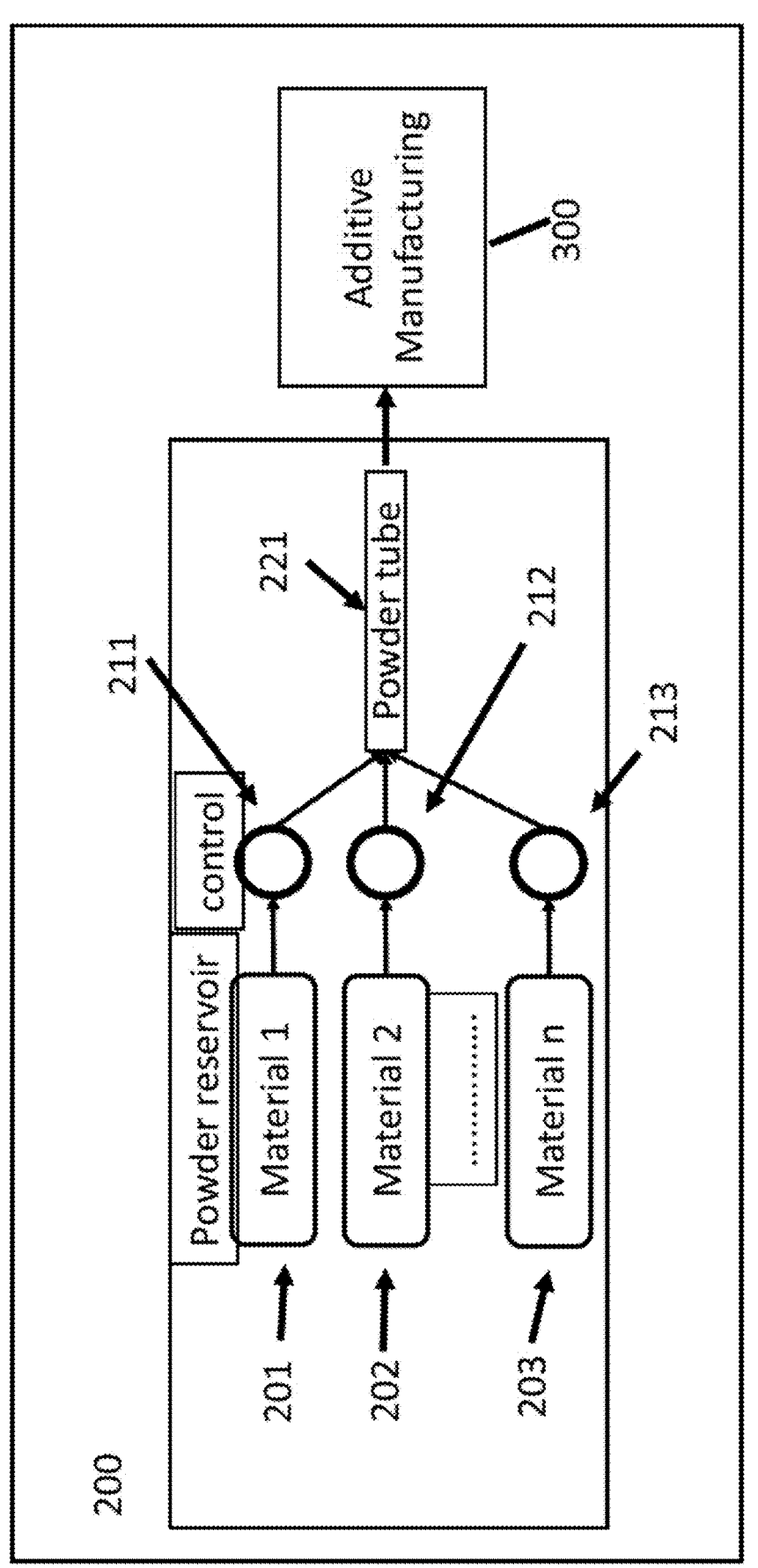
FIG. 5 shows implantation of one stage of the process illustrating material flow to reach graded structured unit from powder reservoirs to additive manufactured components and units.

The detailed description of implantation of materials design, including material flow in stage 200 is illustrated in FIG. 5. The powders are stored in a series of reservoirs, 201, 202, . . . . Composition is controlled by the ratio of powder mixed from the reservoirs. Smooth transition between the functional layers is reached by controlling the flow rate of the multiple material pool. Flow of each material pool is controlled by its own flow rate control 211, 212, . . . . The mixed powder is mixed and carried to powder tube 221. Then feed to additive manufacturing machine 300. The mixed powder from multi-material powder reservoirs are fed to nozzle in powder feed additive manufacturing machine or powder delivery system in powder bed additive manufacturing machine.

Figure 6:
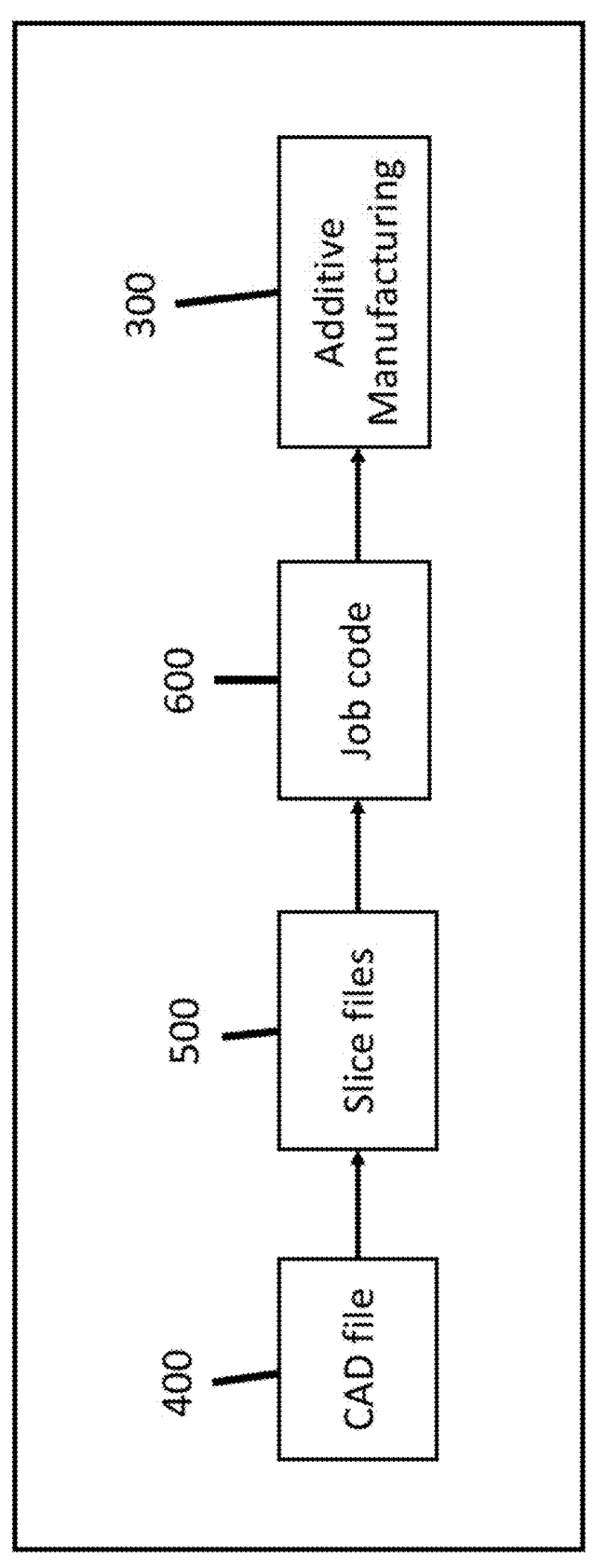
FIG. 6 shows traditional information flow in another stage of the process, processing optimization identified in FIG. 4.

Traditional data flow in additive manufacturing is illustrated in FIG. 6. CAD file 160 obtained from stage 100, product design, are converted to slice files 162. Then the slice files are transferred to machine CAM file in Job code 164. These file can be, for example, in the format of G-code or M-code, depending on the machine and terminology. The job code is uploaded or transferred to an additive manufacturing machine control panel 166 to initiate the building processing.

Figure 7:
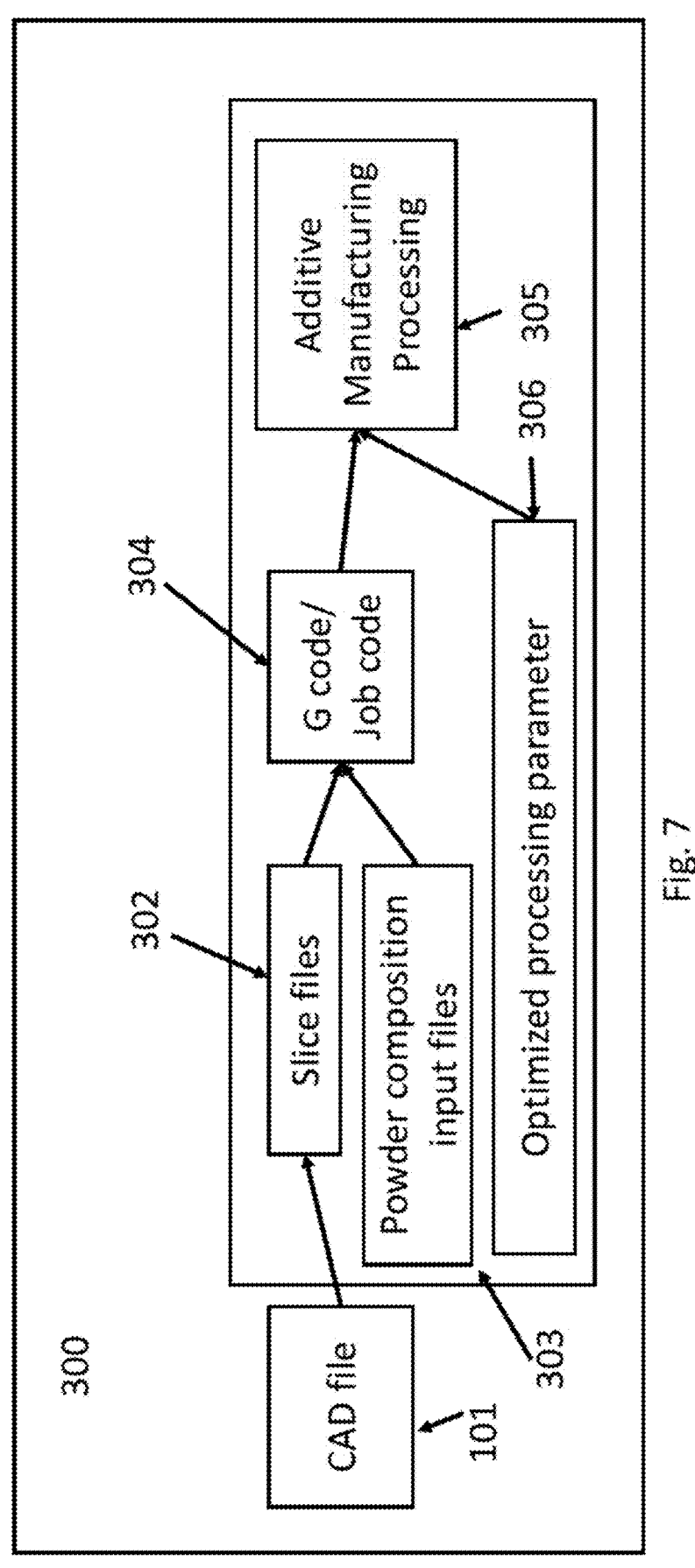
FIG. 7 shows graded structure manufacturing multi-material information flow in stage 300, processing optimization identified in FIG. 1.

In contrast, the data flow in present embodiments disclosed herein has more controls and selections, as shown in FIG. 7. CAD files 101 from stage 100 are fed into slicing tools to generate slice files 302. With powder composition input files 303, generated from stage 200 in material design, the slice files are transferred to G-code or Job code 304. The G-code in the present embodiment has more information in the material selection and powder feed rate ratio for multiple powder reservoirs. Guided by optimized processing parameters 306, the part with transient interface are produced by additive manufacturing processing 305 based on the G-code 304. The slicers or slicing tools may also be coupled with a machine learning algorithm to optimize gradient generation and produce a generative design.

Figure 8:
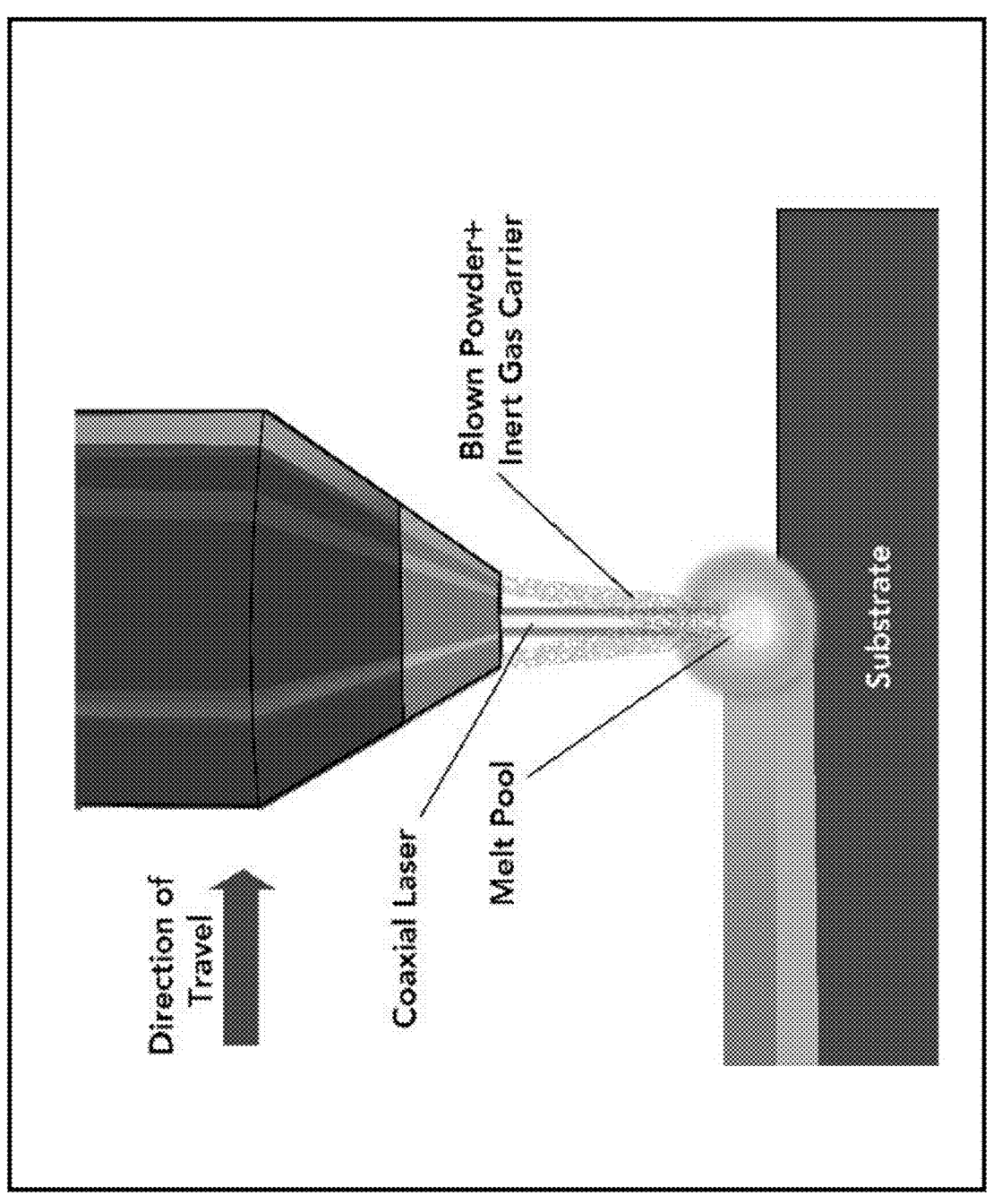
FIG. 8 shows the setup of the laser and powdered material feed used in directed energy deposition (DED) for forming the melt pool on the substrate.
Figure 9:
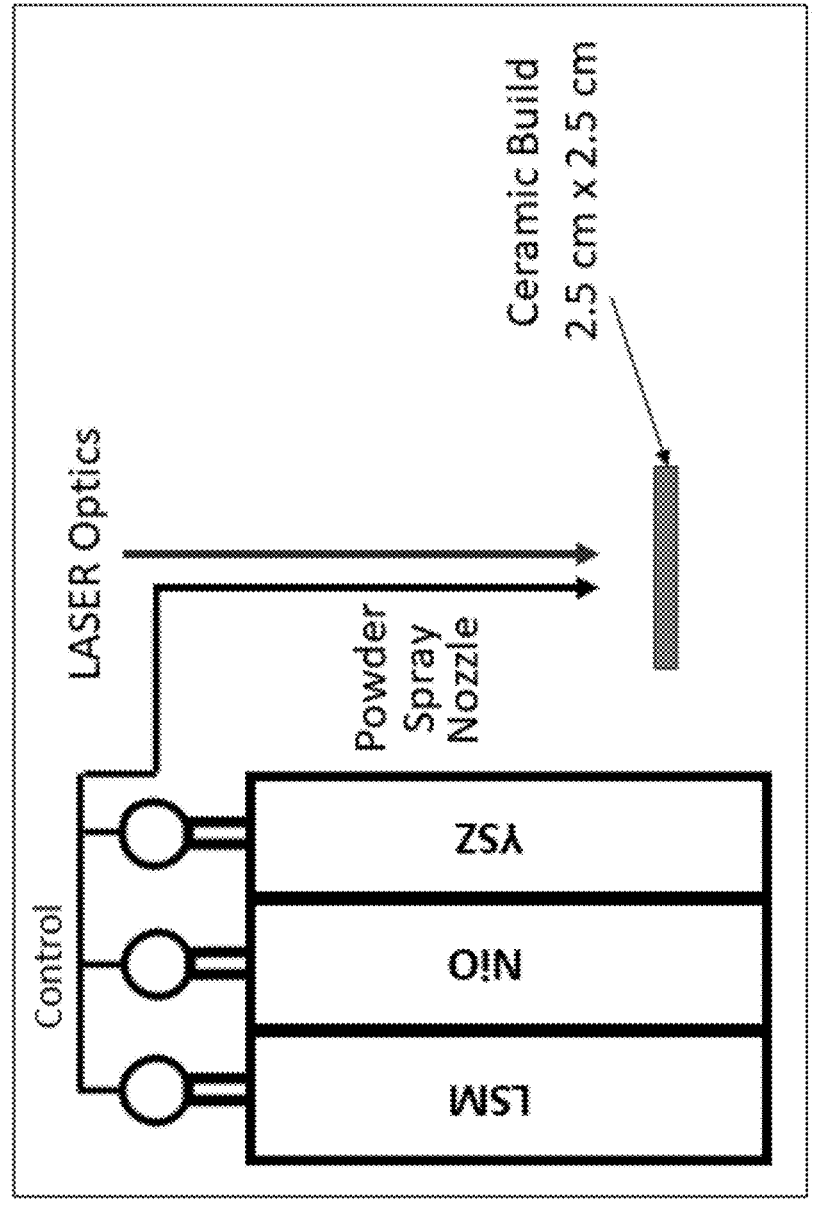
FIG. 9 shows setup of multiple material feed with control to reach multi-material graded structure in solid oxide fuel cell.

The embodiments described herein may utilize a laser-based (DED) additive manufacturing process to continuously fabricate multi-material graded structures in conventional and novel geometries. FIG. 8 illustrates the implementation of present embodiment in fabrication of graded structured solid oxide fuel cell unit using DED with multi material reservoirs. The DED process is initiated when a laser beam is directed onto a starting substrate material. Laser beam characteristics, such as power, beam size, and distance from the substrate are controlled in a manner that optimizes the desired build. The laser energy imparted to the substrate creates a liquid melt pool into which new materials are added. Materials are added by inducing flow of such materials from storage hoppers, through a connecting feed tube, into the melt pool. The laser beam position and corresponding feed tube position are continuously moved in a controlled manner to form the desired geometry. New material that that flows through the feed tube originates from storage hoppers. Multiple storage hoppers, each of which can be filled with different materials, allow for parts to be built with different materials and gradations of materials. As shown in FIG. 9, three powder hoppers are utilized: one for YSZ electrolyte, one for NiO anode, and one for lanthanum strontium manganite (LSM) cathode. Flow rate of powder material from each hopper to the fed tube is controlled in this process. Precisely controlled powder mix with desired ratio is fed into tube and further to powder spray nozzle. In FIG. 8, the depiction of the laser forming the melt pool on a substrate while powdered material is impinged upon the melt pool shows the process of DED in action as a multi-material graded structure is deposited on a substrate.

The fabricated components that are fabricated based on the present embodiment are characterized. Micrographs of three major components in solid oxide fuel cells are illustrated in FIG. 9. The cathode fabricated from LSM powder, electrolyte from YSZ powder and anode from NiO powder shows continuous and solid microstructure as shown in FIG. 9. No pores or voids are observed in the micrographs.

Figures 10A, 10B, 10C:
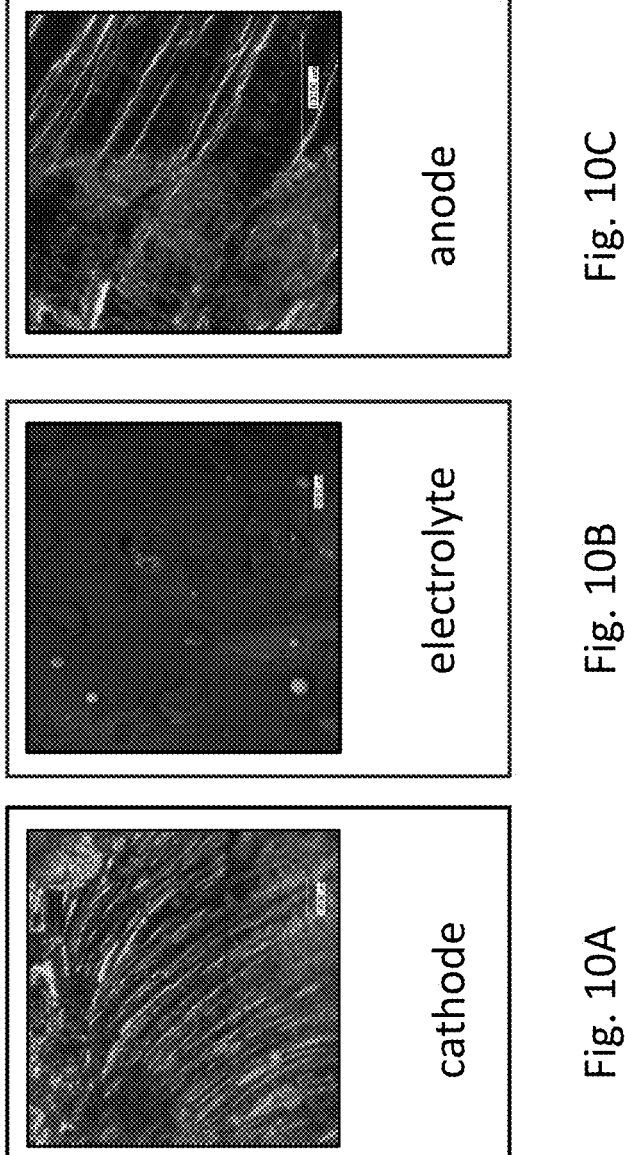
FIG. 10A shows a micrograph of an LSM cathode made by additive manufacturing.
FIG. 10B show a micrograph of a YSZ electrolyte made by additive manufacturing.
FIG. 10C depicts a NiO anode fabricated by additive manufacturing.

FIG. 10A, FIG. 10B, and FIG. 10C show pictures of a 2.5 cm*2.5 cm unit made by additive manufacturing with 100 μm thick YSZ on 200 μm thick NiO. FIG. 10A shows a micrograph of an LSM cathode made by additive manufacturing. FIG. 10B show a micrograph of a YSZ electrolyte made by additive manufacturing. FIG. 10C depicts a NiO anode. The interface between YSZ and NiO is a graded structure with gradient transition on chemical composition. The pictures show the continuous and solid surface of electrolyte YSZ. The micrographs also show continuous microstructure in micrometer scale. The multi-material graded structure at the interfaces for solid oxide fuel cell components has been reached successfully using a DED process where powdered material is formed into a melt pool by a high energy source such as a laser and deposited on a substrate.

Figure 11B:
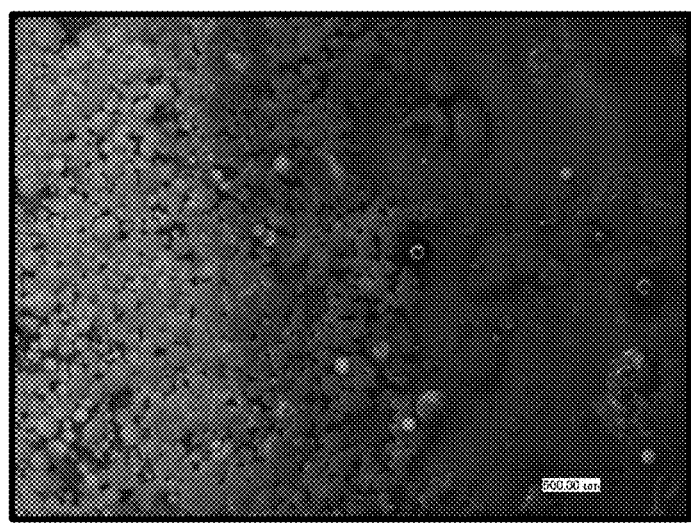
FIG. 11B shows a portion of the multi-material graded structure in FIG. 11A that has been magnified and enhanced for viewing of the microstructure.
Figure 11A:
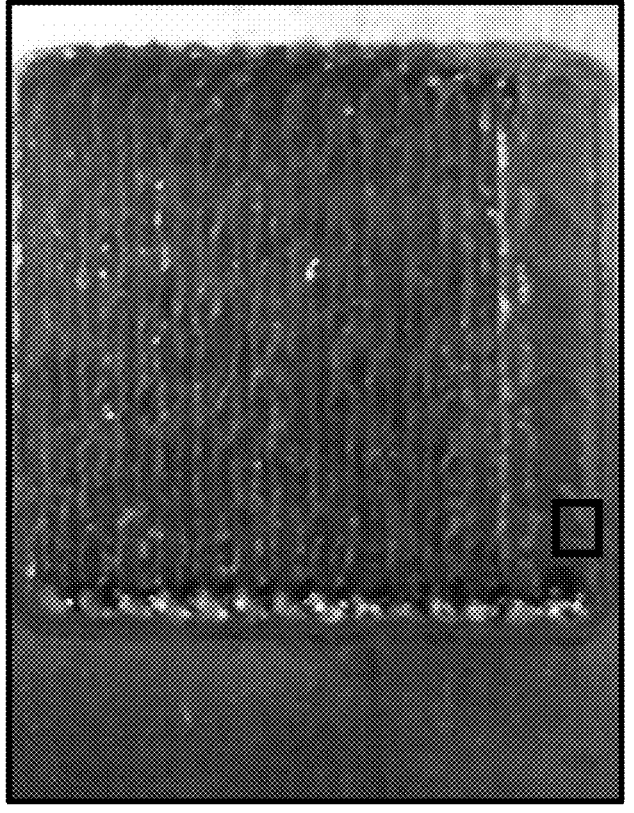
FIG. 11A shows a bird view of a micrograph of YSZ deposited on NiO layers with size of 2.5 cm*2.5 cm.

FIG. 11A shows a multi-material graded structure of YSZ deposited on NiO layers with size of 2.5 cm*2.5 cm. The depiction in FIG. 11B shows a cutaway of one of the portions of the multi-material graded structure in FIG. 11A for more detail of the deposition of the powdered material that has been subsequently melted in the melt pool and applied to the substrate.

Figure 12:
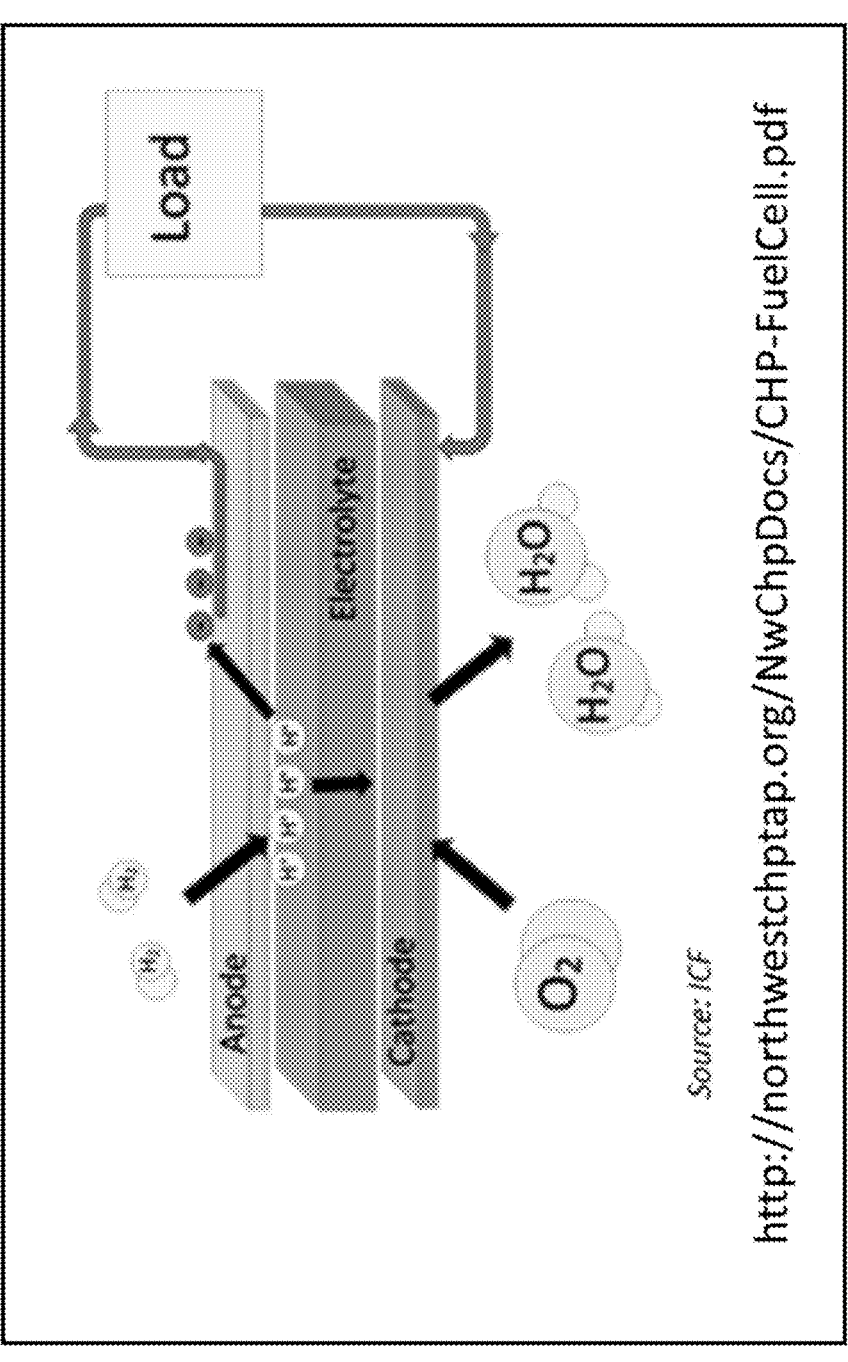
FIG. 12 is a depiction of the components of a fuel cell and the electrochemical process that produces electricity from a fuel source.

The depiction of the fuel cell in FIG. 12 shows the separation of the cathode, the electrolyte, and the anode. It also shows the electrochemical cycle where fuel is put into the fuel-cell and heat, electricity, and water are products of the reaction. This depiction shows distinct layers of the anode electrolyte cathode, unlike the multi-material graded structure that is formed by the additive manufacturing process utilizing the DED process and powdered materials the form a melt pool which is subsequently deposited on a substrate.

Figure 13:
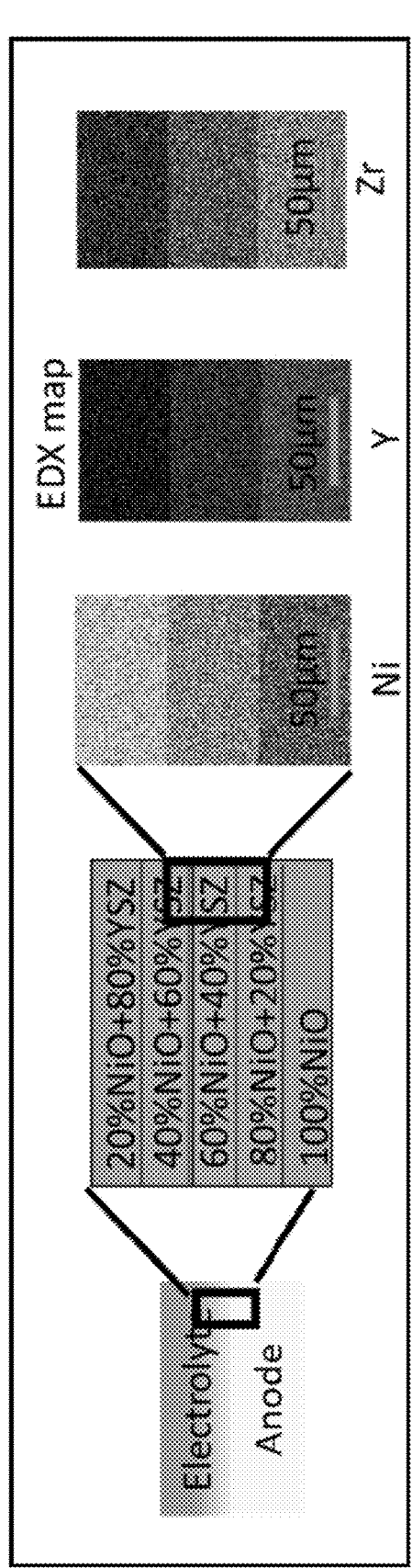
FIG. 13 is a depiction of the multi-material gradient structure showing the gradients between the electrolyte and the anode layer in a fuel cell.

The multi-material graded structure that is shown in FIG. 13 depicts the interface between the electrolyte anode layers of the fuel-cell. It may be seen that the interface is made up of a multi-material graded structure that changes gradually from one layer to the next.

Figure 14B:
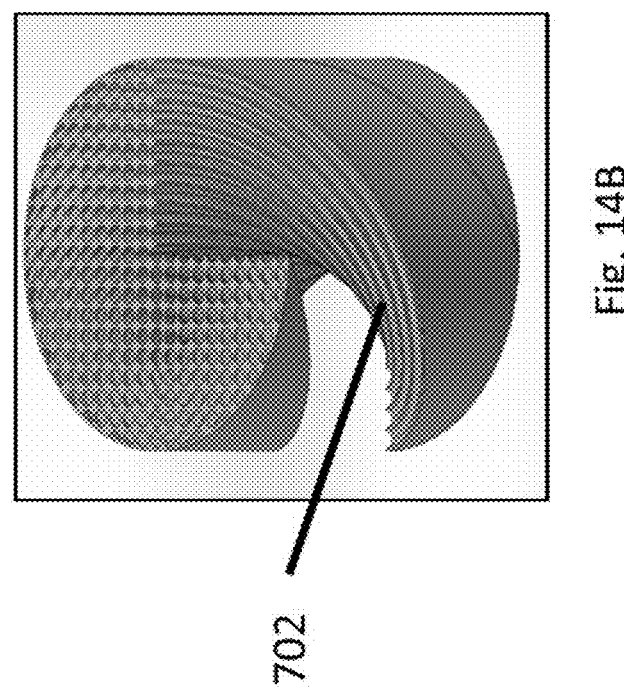
FIG. 14B depicts a cross-section of the fuel cell shown in FIG. 14A, revealing its internal structure.
Figure 14A:
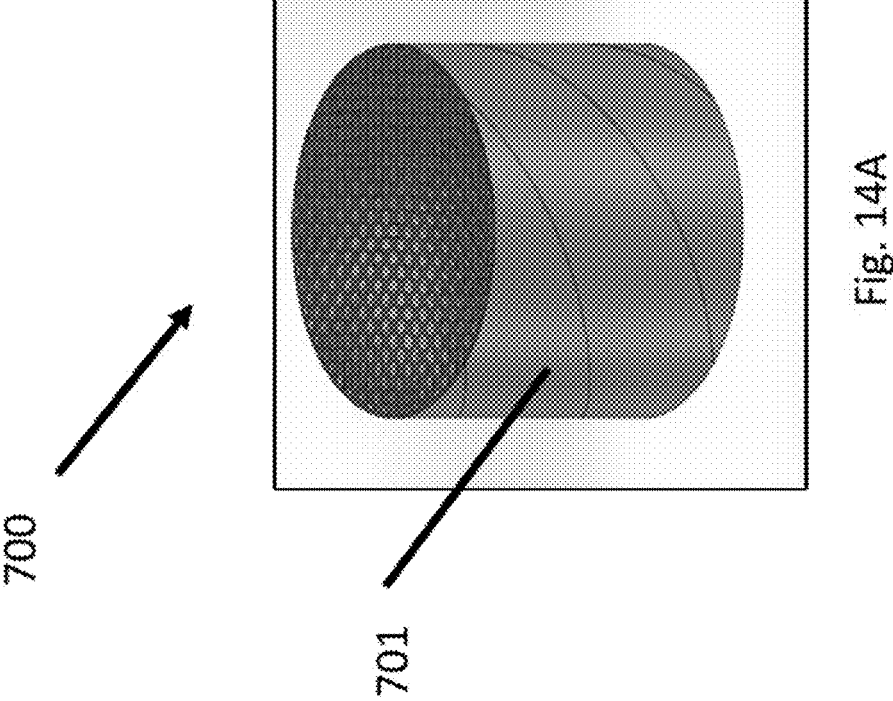
FIG. 14A is a depiction of a fuel cell made with additive manufacturing.

FIGS. 14A and 14B show a reactor 700 with complex channeled structure from different perspectives, which is not manufacturable by traditional manufacturing method. The only feasible method to fabricate it is through additive manufacturing. Using additive manufacturing methods with multi-material capability, it is possible to fabricate the complex structure with both a composition gradient and a structure gradient. The internal structure 702 may be curvilinear or other complex shapes while the exterior 701 may be a plain in shape three dimensional polygon such as a cylinder or cube.

A solid oxide fuel cell has two categories: anode support or cathode support. The size of the unit cell is in the range of 4-2500 cm² with side 5-50 cm. The thickness of the electrolyte is between 3-300 μm. The gradient change from electrode to electrolyte is between 10 μm⁻¹-10 mm⁻¹. In other words, 20% composition change within 4-80 μm. Several different embodiments for SOFC structures can be considered, depending upon desired geometry (planar, tubular, monolithic, unique geometry) of final product. In one tubular embodiment, the cathode is relatively thick compared to the electrolyte, anode, and interconnect. For this case, a graded structure may be envisioned as shown in FIG. 1. The grading between cathode and electrolyte may be uniform at 10% grading per 200 μm thickness. Similarly, the anode in such embodiment may be graded at a higher level, at 10% grading per 15 μm thickness.

The defined range of controlled additive manufacturing method process parameters that result in quality builds of graded of graded structures of any geometric shape. Control and definition of the additive manufacturing process parameters dictates the quality of the continuously built parts. The defined and/or controlled parameters during continuous build include: type of laser, laser power, laser wavelength, laser spot size, laser focal point, laser beam profile, melt pool size, total material flow rate through feed tube, flow rate of each material from each powder hopper, write speed, individual layer dimensions, distance from laser head to part, and distance from powder feed tube to part.

In some cases, the defined and/or controlled parameters during continuous build include:

The type of laser technologies including gas laser (such as CO₂ laser), chemical laser (such as hydrogen fluoride laser), solid state laser (such as ytterbium doped glass fiber laser), dye laser (such as coumarin 102 laser), metal-vapor laser (such as helium cadmium laser). In some cases, laser power for additive manufacturing spans the range from less than 20 watts up to 20,000 watts in constant power or pulsed modes. Laser wavelengths typically ranging from 0.193 μm to 10.6 μm, depending on type of laser. Laser spot size depends on laser system and can be less than 28 μm and up to and exceeding 500 μm. Laser focal point can be positioned at converging or diverging sections of the laser beam. The laser beam profile can be "top hat" or Gaussian, or another suitable profile. The laser beam quality factor is typically between 0.3-20 mm*mrad, although other quality factors may be used.

In embodiments, the melt pool size is controlled by a combination of laser type, wavelength, power, beam size, write speed, material flow (in the case for directed energy deposition). Total material flow rate through the feed tube typically has a typical range of about 0.5-5 grams/minute depending upon powder density. The flow rate of each material from each powder hopper is proportional to the number of hoppers scaled to the total material flow rate through the feed tube. In some cases, the write speed of the DED process is between 0.5-3.0 cm/sec.

The individual layer dimensions range from less than 20 μm to more than 150 μm, or about 20 μm to about 150 μm, or about 30 μm to about 100 μm depending upon powder particle size, laser power size and laser spot size.

The distance from laser head to part typically ranges from 1 cm to up to 10 cm, or about 3 cm to about 8 cm, while the distance from powder feed tube to part typically ranges from 1 cm to up to 10 cm, or about 3 cm to about 8 cm.

In embodiments, controlled and defined parameters for additive manufacturing methods disclosed herein for continuous fabrication of components and systems will impart the following specific properties and characteristics to the built parts:

geometric dimensions, material adhesion between each layer, porosity, composition, including gradients, and mechanical and chemical properties.

A number of alternatives, modifications, variations, or improvements therein may be subsequently made by those skilled in the art, which are also intended to be encompassed by the following claims.

We claim:

1. An apparatus comprising a multi-material graded structure formed from materials that are mixed and melted into a melt pool utilizing a high energy source, wherein the multi-material graded structure comprises a solid cathode, a solid anode, and a solid electrolyte.

2. The apparatus of claim 1 wherein the electrolyte comprises yttria-stabilized zirconia (YSZ).

3. The apparatus of claim 1 where the multi-material graded structure is a solid oxide fuel cell.

4. The apparatus of claim 1 wherein the cathode comprises lanthanum strontium manganite (LSM).

5. The apparatus of claim 1 wherein the electrolyte comprises yttria-stabilized zirconia (YSZ), the anode comprises NiO, and the cathode comprises lanthanum strontium manganite (LSM).

6. The apparatus of claim 1 wherein the multi-material graded structure comprises a battery that includes a positive grid, a positive plate, a separator, a negative grid and a negative plate.

7. The apparatus of claim 1, wherein the structure is graded in at least one of porosity, chemical composition, and/or structure.

8. The apparatus of claim 1 wherein the multi-material graded structure additionally comprises an interconnect.

9. The apparatus of claim 8 wherein the multi-material graded structure is configured to be included in a solid oxide fuel cell.

10. The apparatus of claim 9 wherein the structure of said solid oxide fuel cell comprises a solid oxide fuel cell geometry that is planar, tubular, or monolithic.

11. The apparatus of claim 10 wherein the grading between said cathode and said electrolyte is uniform at 10% grading per 200 μm thickness and the grading between said electrolyte and said anode is uniform at 10% grading per 15 μm thickness.

12. The apparatus of claim 11 wherein the solid oxide fuel cell geometry is tubular, and wherein said cathode comprises the thickest component.

13. The apparatus of claim 8 wherein said electrolyte, said anode, or said interconnect comprises the thickest component.

14. The apparatus of claim 1 wherein the multi-material graded structure comprises functional layers, and said functional layers comprise a positive grid, a positive plate, a separator, a negative grid, and a plate, and wherein the interfaces between said functional layers are designed to be transient with graded structure.

15. The apparatus of claim 1 wherein the multi-material graded structure is a reactor.

16. The apparatus of claim 15 wherein said reactor contains an inner slope and said inner slope is curvilinear.

\* \* \* \* \*